US006067705A

United States Patent [19]

Boyde et al.

[11] Patent Number: 6,067,705

[45] Date of Patent: May 30, 2000

[54] HEADER CONTACT PIN EXTRACTION TOOL AND METHOD OF PIN EXTRACTION

[75] Inventors: Robert L. Boyde, North Riverside; Bruce Lee Burgholzer, Montgomery, both of Ill.

[73] Assignee: Lucent Technologies, Inc., Murray Hill, N.J.

[21] Appl. No.: 08/982,662

[22] Filed: Dec. 2, 1997

[51] Int. Cl.[7] ........ B23P 19/00

[52] U.S. Cl. ........ 29/764; 29/762

[58] Field of Search ........ 29/763, 762

[56] References Cited

U.S. PATENT DOCUMENTS

| | | | |
|---|---|---|---|
| 3,380,141 | 4/1968 | Rofer . | |
| 3,698,058 | 10/1972 | Reimer et al. | 29/200 HC |
| 4,070,755 | 1/1978 | Carter | 29/764 |
| 4,168,569 | 9/1979 | Fairbairn | 29/764 |
| 4,171,565 | 10/1979 | Boudreau et al. | 29/739 |
| 4,285,123 | 8/1981 | Chisholm | 29/764 |
| 4,351,109 | 9/1982 | Kelly et al. | 29/747 |
| 4,402,133 | 9/1983 | Cribbs et al. | 29/739 |
| 4,414,736 | 11/1983 | Fieberg et al. | 29/747 |
| 4,494,305 | 1/1985 | Safai | 29/764 |

OTHER PUBLICATIONS

Berg™ Electronics; Metral ™ Shelf Level Backplane Repair Kit; MT370–01 Manual; Berg PN#412970; Issue 1 Dated May 22, 1992.

*Primary Examiner*—S. Thomas Hughes
*Assistant Examiner*—Kevin G. Vereene

[57] ABSTRACT

A multipin header connector pin extraction tool having a resilient tool head with pin grasping fingers resiliently held in spaced, pin receiving relationship for receipt of a contact pin to be extracted is attached to an elongate tool shank slidingly received within an elongate bore within an elongate tool handle. A pair of opposed cam surfaces and a plurality of detent ball bearings held in associated bearing access openings are carried by the handle. A locking collar slideably moves between a nonlocking position and, when the tool shank has been moved to pin grasping position and a detent groove has been aligned with the access openings, a locking position. The detent ball bearings are held in locking engagement with the detent groove after the tool handle has been pushed against the tool head which is held against the header to cam the fingers into grasping relationship with the object pin. The outer sides of the fingers have open pin receiving grooves for aligning receipt of connector pins immediately adjacent to and on opposite sides of the object pin.

20 Claims, 3 Drawing Sheets

HEADER CONTACT PIN EXTRACTION TOOL AND METHOD OF PIN EXTRACTION

BACKGROUND OF THE INVENTION

1. Field of the Invention

This invention relates to a tool for extracting a selected contact pin from a multipin electrical header connector.

2. Description of the Related Art

A header assembly, or header, as shown in FIG. 1, has a pin mounting wall within which are releasably held a preselected number of contact pins within a preselected plurality of pin mounting holes passing through the wall and arranged in a rectilinear matrix. The wall extends between a pair of generally rectangular resilient fastener legs (not shown) with connector elements for snap fit connection with a back plane header mounting assembly. The header mounting assembly mounts a plurality of headers with their contact pins on one side of the header wall to associated circuit elements.

From time to time it becomes necessary to remove a contact pin from a header on site in order to effectuate repairs. For this purpose it has been known to employ a signal pin extraction tool which has a pair of spaced fingers mounted at the end of an elongate handle within which is mounted a mechanism including an actuator adjacent an end of the handle opposite the pair of spaced fingers. The actuator is linked to the pair of fingers to draw them together to grasp a contact pin and to lock the fingers in a grasping position with respect to the contact pin to be extracted. Reference should be made to the *Torlon Bushings Manual Berg* PN#413723, Rev. A, ECR V61275, published by Berg Electronics, of Etters, Pa., Oct. 10, 1996.

A number of problems or difficulties are presented when attempting to use the known signal contact pin extraction tool. First, the pair of spaced fingers are mounted within a bore of a tool head which extends on opposite sides of the spaced fingers beyond the contact pin locations located immediately adjacent to and on opposite sides of the contact pin to be extracted. Consequently, the head is required to have a pair of pin alignment holes on opposite sides of the pair of spaced fingers for receipt of the contact pins located on opposite sides of the pair of spaced fingers when the contact pin to be extracted is received between the pair of spaced fingers. Because the entire bodies of the adjacent contact pins are received within the pin alignment holes and the contact pin alignment holes can only be seen at the face of the head within which they are located, visibility of both the object contact pin to be extracted and the pair of adjacent contact pins is obscured by the tool head. The obscured vision makes it difficult to properly align the pair of spaced fingers and the pin alignment holes with the object contact pin and the adjacent contact pins.

Another problem arises because the head surrounds and encloses the pair of spaced fingers the width of the forward gap between the pair of fingers within which the object pin is to be received is reduced relative to the full width of the head. This results in a relatively greater accuracy required to insert the object contact pin within the forward gap between the pair of fingers. In addition, the full length of lateral gaps on opposite sides of the forward gap are not accessible for receipt of the object contact pin because the fingers and the lateral gaps are partly surrounded by the head even when the fingers are in a maximally extended position relative to the face of the head. Both of these circumstances relatively increase the difficulty of aligning the object contact pin for receipt between the pair of spaced fingers.

Another problem associated with the known contact pin extraction tool results from a complicated actuator for actuating and locking the pair of fingers in a grasping relationship with the contact pin which employs a pivotally mounted lever. The lever is moved in one direction to open the gap between the fingers. Release of the lever closes the fingers, and pivotal movement of the lever in a another direction is required to lock the fingers in grasping relationship with the contact pin.

SUMMARY OF THE INVENTION

It is therefore the principal object of the invention to provide a header contact pin extraction tool and method of extracting contact pins from a multipin header connector which overcomes the problems noted above with respect to the known header contact pin extraction tool.

In the preferred embodiment of the header contact pin extraction tool of the present invention, the visibility impairment problem is reduced by eliminating the closed pin alignment holes located in the face of the tool head within which the fingers are received with a pair of open face pin alignment grooves located on the backsides of the fingers, themselves. The separate tool head is eliminated, and the full length of the elongate, lateral gaps between the fingers are exposed to facilitate insertion of a contact pin between the fingers. In addition, because the fingers are not received within a tool head the relatively forward gap at the front of the fingers through which the contact pin is received need not be reduced in width. The fingers are mounted for sliding movement relative to a tool handle, and a pair of opposed cam surfaces for squeezing the fingers together as the handle is used to push the fingers against the surface of the header from which the object contact pin protrudes; A lock actuator carried by the handle is slideably moved in the same direction relative to the handle to lock the fingers in a grasping relationship with the contact pin, and the awkward pivotal movement of the actuator handle in two opposite directions to respectively actuate and lock the fingers is eliminated.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DETAILED DESCRIPTION

Figure 1:
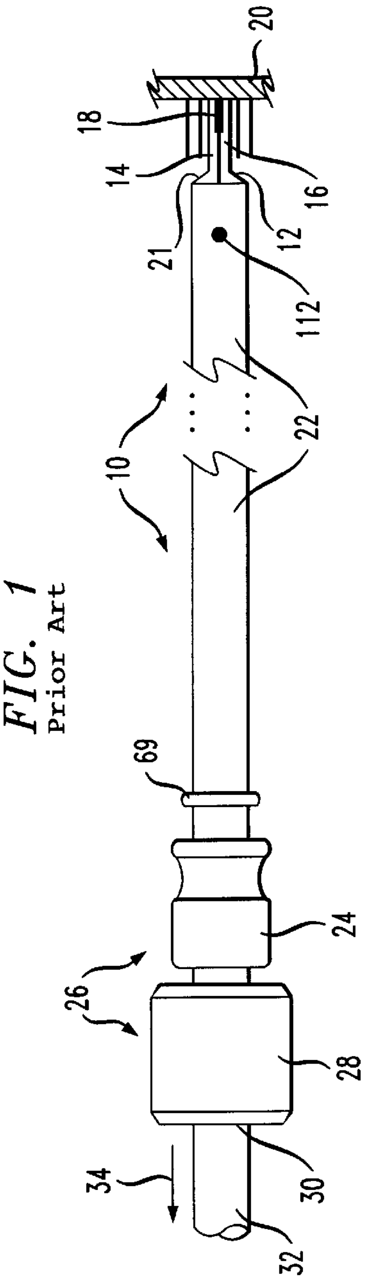
FIG. 1 Prior Art
FIG. 1 is a side view of the of the preferred embodiment of the header contact pin extraction tool of the present invention in grasping locked engagement with a contact pin of a multipin header connector.
Figure 2:
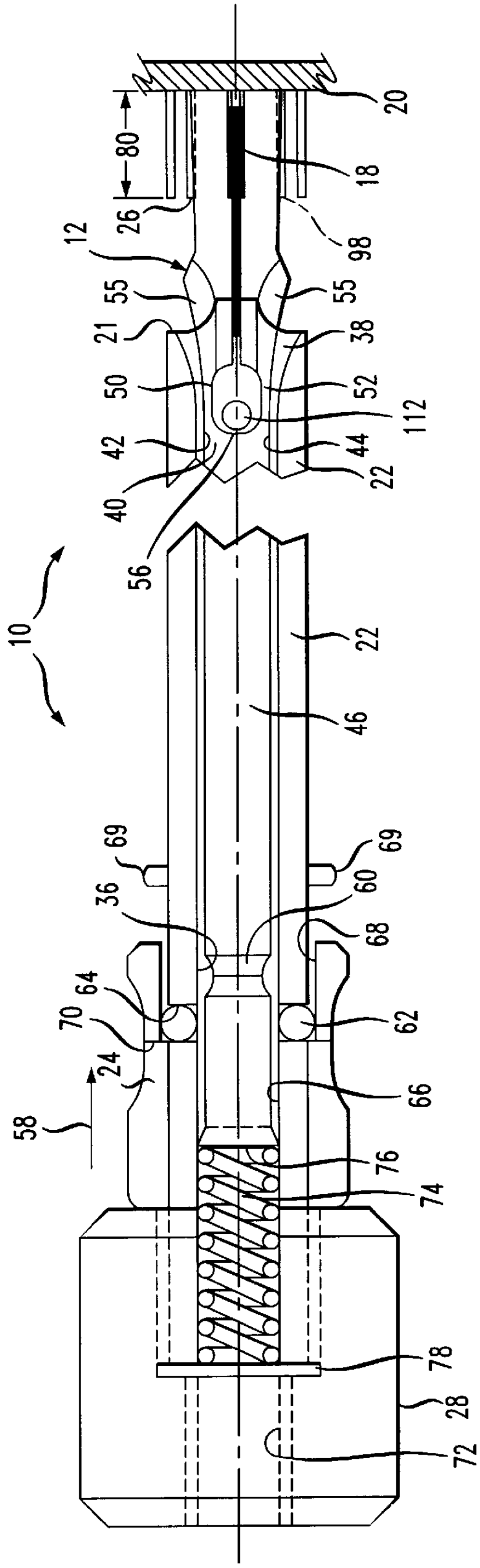
FIG. 2 is an enlarged sectional side view taken along an elongate axis of the pin extraction tool of FIG. 1 but in an unlocked open condition ready to grasp the contact pin selected for extraction.

Referring now to FIG. 1, the preferred embodiment of the header contact pin extraction tool, or pin extraction tool, 10 of the present invention is seen to include a forked tool head 12 with a pair of fingers 14 and 16 resiliently held in spaced relationship on opposite sides of an object contact pin 18, i.e. the contact pin to be extracted from a multipin header connector, or header, 20. The tool head 12 is mounted outwardly to a distal end 21 of an elongate, cylindrical tool handle 22. An annular locking collar 24 is mounted to the elongate tool handle 22 at an end portion 26 opposite the distal end 21 for relative sliding movement between a locking position, as shown in FIG. 1, and an unlocking position, as shown in FIG. 2. Located rearwardly of the locking collar 24 is an enlarged diameter, barrel-like, hand grip 28. The barrel-like, hand grip 28 also functions as a connector fitting for releasably connecting an end 30 of a slide hammer 32 (only a portion shown) to the end portion 26 in coalignment with the elongate axis of the elongate tool handle 22.

After the pin extraction tool 10 has the object pin 18 in locked grasped relationship, the slide hammer 32 is used to impart repetitive hammer-like impulse forces to the pin extraction tool in the direction of arrow 34 to pull the object pin out of the pin mounting surface of the header 20. The details of the slide hammer forms no part of the present invention and therefore the remaining details of the slide hammer are neither shown or discussed further.

Figure 3:
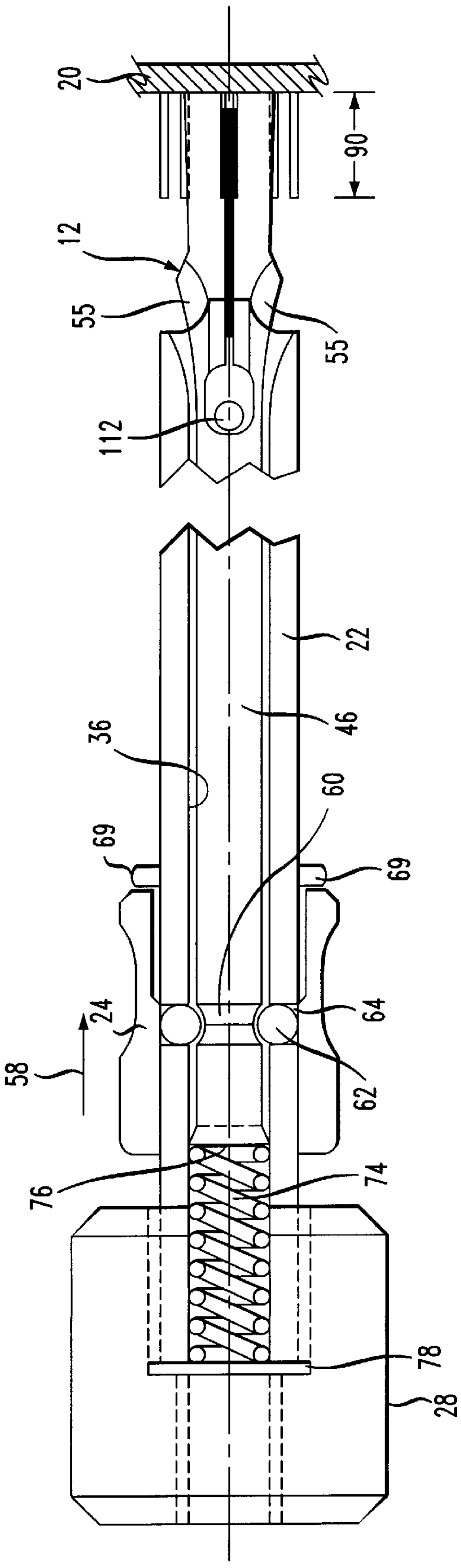
FIG. 3 is a cross sectional side view similar to that of FIG. 2 but in which the pin extraction tool is in grasping locked engagement with the contact pin selected for extraction.

Referring now to FIGS. 2 and 3, the elongate, tool handle 22 has an elongate centrally located bore with an elongate cylindrical section 36 and a truncated fennel-shaped guide section 38 defining an enlarged opening to the bore adjacent the open distal end 21. The juncture 40 where the guide section 38 joins the cylindrical section 36 of the bore defines one end of a pair of opposed cam surfaces 42 and 44. The tool head 12 is mounted to the elongate tool handle 22 for relative sliding movement by means of an elongate cylindrical tool shank 46 that is slidably received within the cylindrical section 36 of the bore. The tool head 12 has a pair of slanted camming surfaces, 50 and 52 on the outer sides of the pair of fingers 14 and 16 for sliding mating engagement with the pair of opposed cam surfaces 42 and 44 within the bore.

The opposed cam surfaces 42 and 44 cooperate with the slanted camming surfaces 50 and 52, respectively, to move the fingers 14 and 16 toward each other into firm grasping relationship with the object pin 18 received between the fingers 14 and 16. The tool head 12 including the fingers 14 and 16, are integrally formed from a single piece of resilient metal such as tempered steel. In an unrestrained state the fingers 14 and 16 are thereby resiliently held in spaced relationship to provide a pin receiving space 54, FIGS. 4B and 4C, between the fingers 14 and 16 to receive the object contact pin 18. When using the header contact pin extraction tool 10, the tool head 12 and the tool handle 22 are first placed in a relatively extended position in which the slanted camming surfaces 50 and 52 of the fingers and 14 and 16 are laterally spaced from and disengaged from the pair of opposed cam surfaces 42 and 44. The unrestrained fingers 14 and 16 are therefore held by the connection of their inner ends at a neck portion 56 of the head 12 to provide the pin receiving space 54.

As shown in FIGS. 2, 3, 4*a* and 4*b*, the tool head 12 has reduced surfaces 55 to direct the force resulting from the interaction of slanted the camming surfaces 50 and 52 and the opposed cam surfaces 42 and 44, respectively, to the fingers 14 and 16 to increase the pressure on the contact pin 18 grasped by the fingers 14 and 16.

The header contact pin extraction tool 10 is the held by the hand grip 28 alone or in combination with one or both of the locking collar 24 and the aft portion of the handle 22 to maneuver the distal ends of the fingers 14 and 16 into abutting relationship with the surface of the header 20 with the object contact pin 18 fully inserted into the pin receiving space 54. Still using the hand grip 28, etc. the handle 22 is then pressed toward the header 20 in the direction of arrow 58 with the header 20 and the elongate tool shank 46 being held stationary by the abutting relationship of the distal ends of the fingers 14 ad 16 with the surface of the header 20. This relative movement is continued until the tool head 12 and the tool handle 22 have moved to a relatively retracted position, as best shown in FIG. 3. In this relatively retracted position, the opposed cam surfaces 42 and 44 are in engagement with the mating slanted camming surfaces 50 and 52 and have thereby squeezed the opposed pair of fingers 14 and 16 together into firm grasping relationship with the object contact pin 18 located between the fingers 14 and 16.

In another embodiment, the side hammer 32 is used to lock the fingers 14 and 16 of the tool head 12 to the object contact pin 18. This is accomplished by positioning the object contact pin 18 between the fingers 14 and 16 of the tool head 12 and then using the slide hammer 32 to impact repetitive hammer-like forces in the direction of the arrow 58 until the opposed cam surfaces 42 and 44 are in engagement with the mating slanted camming surfaces 50 and 52 and have thereby squeezed the opposed pair of fingers 14 and 16 together into a firm grasping relationship with the object contact pin 18 located between the fingers 14 and 16.

While still holding the pin extraction tool 10 against the header 20, the tool head 12 and the tool handle 22 are then locked into the relatively retracted pin grasping position, as shown in FIGS. 1 and 3. Referring to FIG. 3, the elongate tool shank has an annular arcuate detent groove 60, and the tool handle carries detent latch members in the form of a plurality of bearings 62, preferably three, which are held in an equal plurality of associated detent bearing access openings 64, respectively, are selectively a ball bearing, a detent bearing, and a spherical bearing. The access openings are arranged in spaced relationship around the circumference of the handle 22 at a preselected location that aligns with the annular detent groove 60 when the pin extraction tool 10 is in the retracted position. The plurality of bearings 62 ride along the surface of the tool shank 46 during movement of the handle 22 toward the header 20, and when the alignment occurs, the plurality of bearings 62 are enabled to move inwardly through their associated detent bearing access openings 64 into locking engagement within the annular detent groove 60. The locking collar 24 is then slid forwardly in the direction of arrow 58 from the position shown in FIG. 2 to the relatively forward position shown in FIG. 3 to press the plurality of bearings 62 through the associated detent bearing access openings 64 into locking engagement with the annular detent groove 60 and to then to block them from radial outward movement away from locking engagement with the annular detent groove 60.

As seen in FIG. 2, the locking collar 22 has a bore with an aft, relatively reduced diameter section 66, a forward, relatively enlarged diameter section 68 and a shoulder 70 interconnecting the sections 66 and 68. The diameter of the aft section 66 is only slightly larger than the outer diameter of the handle 22 to facilitate a secure sliding relationship of the locking collar 22 with the outer surface of the handle 22. The diameter of the enlarged forward section 68 of the locking collar 22, on the other hand, sufficiently greater than the outer diameter of the handle 22 to accommodate the plurality of bearings 62 within their associated detent bearing access openings 64 even when the pin extraction tool 10 is in the relatively extended position and block the plurality of bearings 62 from radial movement out of the associated detent bearing access openings 64. A stop ring 69 extending radially from the outer surface of the handle 22 prevent overtravel of the locking collar 22.

The difference between the minimum diameter of the annular detent groove 60 and the outer diameter of the tool shank 46 is approximately equal to the difference between the inner diameters of the aft cylindrical bore section 66 and the forward funnel-like bore section 68. Accordingly, when the associated detent bearing access openings 64 are aligned with the annular detent groove 60, forward sliding movement of the locking collar 24 causes the shoulder to nudge, or press, the plurality of bearings 62 radially inwardly into snug received relationship within the annular, detent groove 60 to enable the inner wall of the aft bore section 66 to slide over the outer sides of the plurality of bearings 62 and span the associated detent bearing access openings 64 to block removal of the plurality of bearings 62 from locking engagement with the annular detent groove 60. In this locked condition the handle 22 cannot move relative to the tool shank 46, and thus the fingers are locked in firm grasping relationship with the object pin 18. The pin extraction tool 10 is then connected to the slide hammer 32 by means of a threaded bore 72 in the end of the hand grip 28, and the hammer is used to pound out the object contact pin 18 from the header connector.

After the object pin 18 has been extracted it is released from the pin extraction tool 10 by moving the locking collar 24 from the locking position, as shown in FIGS. 1 and 3, in a direction opposite to that of arrow 58 relative to the handle 22 while being held by the hand grip 28. When the locking collar 24 reaches the nonlocking position, as shown in FIG. 2, a helical coil spring 74, which is squeezed into a compressed state between and end face 76 of the tool shank 46 and a spring retainer wall 78 spanning the bore 36 adjacent the forward end of the hand grip 28. When the pin extraction tool 10 is in the nonlocking condition, the spring 74 resiliently biases the tool shank 46 to move forward in the direction of arrow 58. This causes the plurality of bearings 62 to be nudged outwardly away from locking engagement with the annular detent groove 60 and radially outwardly through the associated detent bearing access openings 64 to enable the bias spring 74 to automatically push the tool shank 46 to the fully extended position in which the fingers are disengaged from the pair of opposed cam surfaces 42 and 44. When the fingers 14 and 16 are disengaged, they resiliently return to an open position in which there is a space for release of the contact pin just extracted and for receipt of the next object contact pin 18 to be extracted. The pin extraction tool 10 is then in condition for use to extract another contact pin.

It should be appreciated from this description of the manner in which the tool is used that unlike the known tool noted above, all the movements needed to both grasp the object contact pin 18 and to lock the tool 10 all proceed in the single direction of arrow 58 toward the header 20 to facilitate a smooth and efficient grasping of the contact pin 18. Also, only a single action is required to both fit the pin extraction tool 10 in correct extraction position in abutment with the surface of the header 20 on opposite sides of the object contact pin 18 and to close the fingers 14 and 16 into grasping relationship with the contact pin 18. Instead of having to manipulate a pivotally mounted actuator in a lateral, or radial, direction at the rearward end of the tool handle 22 in order to move the fingers at the front of the tool to grasp the contact pin while at the same time trying to hold the fingers against the header with the contact pin 18 in proper position, all the operator need do after pushing the distal ends of the fingers 14 and 16 against the header 20 with the contact pin 18 in proper alignment is to continue to push the tool against the header 20 to perform both the steps of aligning and grasping in a single forward movement of the tool handle 22.

The tool handle 22 is at least partly held by the locking collar 24 and all three steps of aligning, grasping and locking are automatically performed in a single forward movement of the locking collar 24. Alternatively, the step of grasping and locking is accomplished with the slide hammer 32 as previously described herein. Before the annular detent groove 60 becomes aligned with the ball bearing access openings 64, the plurality of bearings 62 bear against the shoulder 70 and thereby block the locking collar from sliding forwardly relative to the handle 22 and is thereby enabled to function as a hand grip independently or in conjunction with the hand grip 28. However, as soon as the handle 22 has been moved to the relatively retracted position, as shown in FIG. 3, continued pressure on the locking collar 24 is no longer transferred to the handle 22 and the fingers 14 and 16 to the header 20. Instead, continued pressure automatically results in sliding movement of the locking collar 24 to the locking position, as shown in FIGS. 1 and 3. In addition to facilitating the extraction process, it should also be appreciated that the arrangement of the tool head 12, the tool shank 46, the tool handle 22 and the locking collar 24 provide a simple working assemblage which has eliminated the need for pivotal connectors for finger actuators and for elongate linkages to the fingers from the actuators which are prone to mechanical wear and breakage and depending on the position of the actuators and the linkages the creation of an obstruction in the operation of the tool.

Figure 4A:
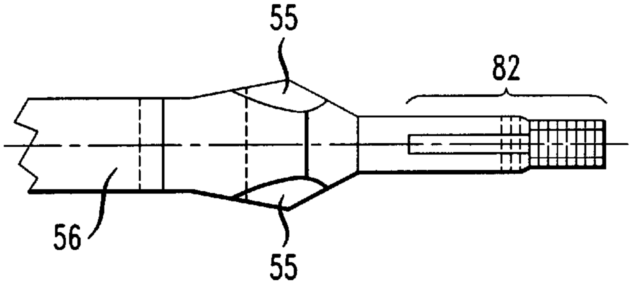
FIG. 4A is a plan view of the tool head portion of the pin extraction tool of FIGS. 1–3.
Figure 4B:
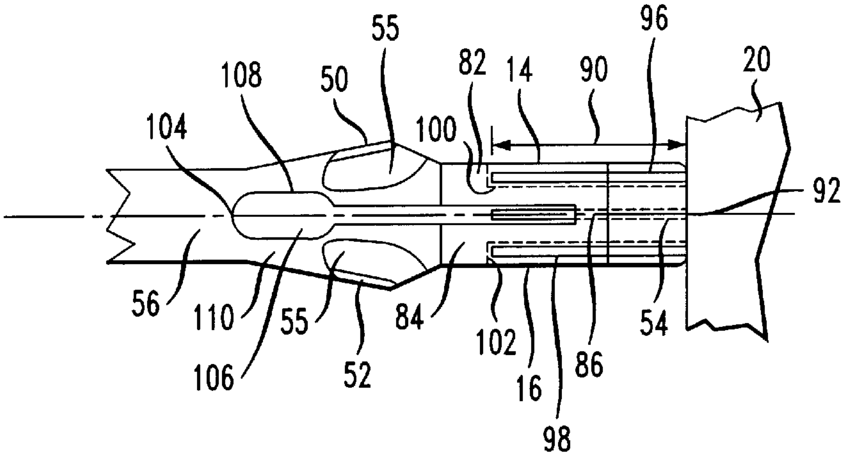
FIG. 4B is a side view of the tool head of FIG. 4A.
Figure 4C:
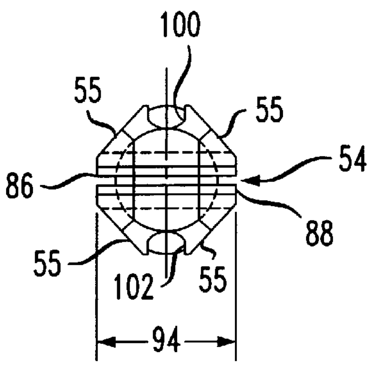
FIG. 4C is an end view of the tool head of FIGS. 4A and 4B.

Referring now also to FIGS. 4A, 4B and 4C, the contact pins extend from the planer surface of the header by a predetermined protuberant contact pin length 80, as seen in FIGS. 2 and 3, and the fingers 14 and 16 have pin engaging ends 82 and 84 on opposite sides of the pin receiving space 54 which define lateral access openings 86 and 88 having a length 90 not less than, and preferably substantially equal to, the protuberant pin length 80. This length 90 of the lateral access openings 86 and 88 remain entirely outside of the bore 36 to facilitate easy insertion of the contact pin 18 between the fingers 14 and 16 even when the contact pin 18 is bent which is often the case with respect to the pins which need removal and replacement. Likewise facilitating easy insertion of the contact pins 18 between the fingers 14 and 16, because the pin engaging ends 82 and 84 themselves do not enter into the open end 21 of the elongate handle, as best seen in FIG. 4C, the forward access opening or gap 92 to the pin receiving space 54 have a width 94 which is substantially equal to the widest portion of the slanted camming surfaces 50 and 52 and to the entire distance between the contact pins located laterally on either side of the object pin 18 (not shown) to give the pin receiving space maximum dimension for maximum ease of pin insertion.

Also substantially enhancing ease of pin insertion by enhancing visibility of the pins 96 and 98 is the provision of elongate open grooves 100 and 102 in the outer sides of the pin engaging ends 82 and 84 of the fingers 14 and 16, respectively, for receipt of the contact pins 96 and 98 located immediately adjacent to and on opposite upper and lower sides of the object contact pin 18 to be extracted when the object pin 18 is within the pin receiving space 54. The elongate open grooves 100 and 102 have a length approximately equal to the protuberant pin length 90. The pair of contact pins 96 and 98 are separated by twice the amount of the distance between adjacent pins, or the predetermined pin separation distance of the header 20. The open grooves 96 and 98 have a bottom, innermost surface which are separated from each other by a distance slightly less than twice the pin separation distance. Unlike the pin receiving holes located within a tool head within which the fingers are retracted and with openings that cannot be seen from above or from below the tool head 12, the open face grooves 100 and 102 both enhance visibility and dimensional tolerance for misalignment of pin and tool.

The opposed distal pin engaging ends 82 and 84 of the fingers 14 and 16 are especially adapted with gripping surfaces with a plurality of serrations arranged in side by side relationship along a forward part of the pin engaging ends 82 and 84. The slanted camming surfaces 50 and 52 are located intermediate the inner ends of the pin engaging ends 82 and 84 and the neck 56 to enable the greater forward protrusion of the pin engaging ends 82 and 84. Also, they are tapered inwardly toward each other in a direction opposite to arrow 58 from the distal ends of the fingers toward where the ends of the fingers 14 and 16 are joined. As best seen in FIG. 4B, the fingers 14 and 16 are joined in resilient spaced relationship at an inner end 104 of an oval slot 106 which produces narrowed sections 108 and 110 of the head 12. The narrowed sections 108 and 110 are located forward of the end 104 at which point the fingers pivot and rearward of the pin engaging ends 82 and 84 opposite the slanted camming surfaces 50 and 52 to enhance resiliency. In addition, the oval slot 106 performs a dual function of receiving a removable restraint pin 112 which spans the opposite sides of the handle 22 adjacent the cam surfaces 42 and 44 in a direction parallel to the pivot axis of the fingers 14 and 16 and which is secured to the handle 22 by means a threaded connection or other suitable releasable connection. The diameter of the restraint pin 112 is smaller than the vertical width of the oval restraint slot to permit the pivotal movement of the fingers but is larger than the relatively narrow separation between the fingers 14 and 16 forward of the oval restraint slot 106 and thereby blocks forward overtravel of the tool head 12 and the tool shank 46 relative to the handle 22 in the direction of the arrow 58.

While a preferred embodiment of the header contact pin extraction tool and method of header pin extraction have been disclosed in detail, it should be appreciated that many variations may be made to these details without departing from the scope of the invention that is defined in the appended claims. For instance, while the fingers are preferably integrally formed together of resilient steel and are thereby resiliently held in spaced relationship from which they are cammed together, the use of an assembly of discrete fingers with separate means for resiliently biasing them outwardly into camming engagement with the cam surfaces carried by the handle is contemplated. Likewise, means other than the helical spring located at and co-acting with the end face of the tool shank for resiliently biasing the tool shank are also capable of being successfully employed to perform this function.

What is claimed is:

1. A header contact pin extraction tool assembly, comprising:

a tool head with a pair of fingers resiliently held in spaced relationship;

an elongate tool handle for holding the tool head and carrying a pair of opposed cam surfaces; in which the elongate tool handle has a bearing; and means for mounting the tool head and the tool handle for relative sliding movement between a relatively extended position in which the fingers are disengaged from the pair of opposed cam surfaces and there is a pin receiving space between the fingers for receipt of a contact pin, and a relatively retracted position in which the fingers are squeezed together by the opposed cam surfaces into firm grasping relationship with the contact pin if received within the pin receiving space and engagement by the bearing and the fingers.

2. The header contact pin extraction tool of claim 1 in which the mounting means includes an elongate bore with an open end, and said cam surfaces are located within the bore and adjacent the open end.

3. The header contact pin extraction tool of claim 2 in which contact pins extend from a planer surface of the header by a predetermined protuberant contact pin length, and the fingers have pin engaging ends on opposite sides of the pin receiving space defining elongate, lateral access openings to the pin receiving space having a length located entirely outside of the bore that is at least as long as the protuberant contact pin length.

4. The header contact pin extraction tool of claim 3 in which each of the pair of fingers has an outer side with an elongate open groove for receipt of an associated one of a pair of contact pins located immediately adjacent to and on opposite sides of the contact pin to be extracted when within the pin receiving space.

5. The header contact pin extraction tool of claim 4 in which the elongate open groove has a length at least as long as the protuberant contact pin length.

6. The header contact pin extraction tool of claim 4 in which the pair of contact pins located immediately adjacent to and on opposite sides of the pin to be extracted are separated by twice the amount of a predetermined contact pin separation distance, the elongate open groove of each of the pair of fingers has a bottom, innermost surface, and the bottom, innermost surface of the groove of one of said pair of said pair of fingers is separated from the bottom, innermost of the groove of another one of said pair of fingers by a distance less than twice said pin separation distance.

7. The header contact pin extraction tool of claim 2 in which the mounting means includes a tool shank having an elongate body slidably received within the bore and a distal end attached to the tool head adjacent the open end.

8. The header contact pin extraction tool of claim 7 including means for resiliently biasing the shank for movement toward the relatively extended position.

9. The header contact pin extraction tool of claim 8 including means for releasably locking the shank against movement by the biasing means to the relatively extended position after the tool head and the tool handle have been moved to the relatively retracted position.

10. The header contact pin extraction tool of claim 9 in which said locking means includes a detent carried by the body within the elongate bore, a detent latch member carried by the tool handle, and means for pressing the detent latch member into locking engagement with the detent when the tool shank is in a position corresponding to the retracted position.

11. The header contact pin extraction tool of claim 10 in which the detent latch member includes the bearing held in a bearing access opening in a side wall of the bore for rolling engagement within the body of the tool shank when the tool shank is being slid within the bore and for locking receipt within the detent when the detent is aligned with the bearing access opening, and said pressing means includes a collar carried by the tool for holding the bearing in locking engagement within the detent.

12. The header contact pin extraction tool of claim 11 which said collar is mounted for sliding movement relative to the tool handle between a locking position in which the bearing is blocked from removal from within locking engagement with the detent and a nonlocking position in which the shank is enabled to slidably move within the bore to move the bearing out of locking engagement with the detent and into rolling engagement with the tool shank.

13. The header contact pin extraction tool of claim 11 in which the detent is an arcuately shaped annular groove extending around the shank.

14. The header contact pin extraction tool of claim 1 in which the tool head includes a neck at which opposed ends of the fingers are joined and resiliently held in spaced relationship.

15. The header contact pin extraction tool of claim 14 in which the neck carries a pair of camming surfaces for mating camming engagement with the pair of cam surfaces, said camming surfaces extending from the inner ends of the fingers to a location spaced from the contact pin engaging distal ends of the fingers.

16. The header contact pin extraction tool of claim 15 in which said camming surfaces are tapered inwardly toward each other in a direction extending from the distal ends of the fingers toward the inner ends of the fingers where they are joined at the neck.

17. The header contact pin extraction tool of claim 1 including means for locking the tool head and the tool handle in the relatively retracted position.

18. The header contact pin extraction tool of claim 1 in which the fingers are integrally formed together of resilient metal material.

19. The header contact pin extraction tool of claim 1 in which the tool handle has an elongate bore within which is slidably received an elongate tool shank having an end connected to the tool head.

20. The header contact pin extraction tool of claim 19 in which the pair of fingers are integrally formed with and adjacent an end of the elongate tool shank.

* * * * *